(12) United States Patent
Shimada et al.

(10) Patent No.: US 11,962,064 B2
(45) Date of Patent: Apr. 16, 2024

(54) RFID TAG AND ANTENNA

(71) Applicant: DAIO PAPER CORPORATION, Ehime (JP)

(72) Inventors: Takuro Shimada, Kagawa (JP); Alina Bista, Ehime (JP); Daiji Matsunoshita, Kanagawa (JP)

(73) Assignee: DAIO PAPER CORPORATION, Ehime (JP)

( * ) Notice: Subject to any disclaimer, the term of this patent is extended or adjusted under 35 U.S.C. 154(b) by 63 days.

(21) Appl. No.: 17/596,962

(22) PCT Filed: Jul. 16, 2020

(86) PCT No.: PCT/JP2020/027729
§ 371 (c)(1),
(2) Date: Dec. 22, 2021

(87) PCT Pub. No.: WO2021/015100
PCT Pub. Date: Jan. 28, 2021

(65) Prior Publication Data
US 2022/0247063 A1    Aug. 4, 2022

(30) Foreign Application Priority Data

Jul. 19, 2019  (JP) .................................. 2019-134034

(51) Int. Cl.
  *H01Q 1/22* (2006.01)
  *G06K 19/077* (2006.01)
  *H01Q 1/36* (2006.01)

(52) U.S. Cl.
  CPC ..... *H01Q 1/2225* (2013.01); *G06K 19/07773* (2013.01); *H01Q 1/36* (2013.01)

(58) Field of Classification Search
  CPC ... H01Q 1/2225; H01Q 1/36; G06K 19/07773
  USPC ......................................................... 235/492
  See application file for complete search history.

(56) References Cited

U.S. PATENT DOCUMENTS

| 9,547,817 | B2* | 1/2017 | Akamatsu | ............... H01Q 9/24 |
| 2006/0208955 | A1 | 9/2006 | Kai et al. | |
| 2007/0188327 | A1 | 8/2007 | Keeton et al. | |
| 2008/0316129 | A1* | 12/2008 | Ritamaki | ............. H01Q 1/2208 |
| | | | | 343/866 |

(Continued)

FOREIGN PATENT DOCUMENTS

| JP | 2006-295879 | 10/2006 |
| JP | 2007-221772 | 8/2007 |
| JP | 2013-114513 | 6/2013 |

OTHER PUBLICATIONS

Chinese First Office Action for 202080031758.5 dated Mar. 25, 2023.

(Continued)

*Primary Examiner* — Michael G Lee
*Assistant Examiner* — David Tardif
(74) *Attorney, Agent, or Firm* — IPUSA, PLLC (57) ABSTRACT

An RFID tag includes an IC chip on which identification information is recorded, a loop-like conductor that is connected to the IC chip, and an antenna unit that includes two lattice-shaped antenna patterns connected to the loop-like conductor and extending away from each other from the loop-like conductor.

9 Claims, 6 Drawing Sheets

(56) References Cited

U.S. PATENT DOCUMENTS

| | | | |
|---|---|---|---|
| 2009/0207087 A1* | 8/2009 | Fang | H01Q 1/38 343/700 MS |
| 2010/0051699 A1* | 3/2010 | Speich | G06K 19/07749 235/492 |
| 2010/0097191 A1* | 4/2010 | Yamagajo | H01Q 1/36 340/10.1 |
| 2010/0097280 A1* | 4/2010 | Zirbes | H01Q 9/28 343/726 |
| 2012/0223145 A1* | 9/2012 | Stewart | G06K 19/04 235/492 |
| 2016/0012329 A1 | 1/2016 | Machado et al. | |
| 2019/0081402 A1* | 3/2019 | Kato | H01Q 1/36 |

OTHER PUBLICATIONS

International Search Report dated Sep. 24, 2020 with respect to PCT/JP2020/027729 filed on Jul. 16, 2020.

* cited by examiner

RFID TAG AND ANTENNA

TECHNICAL FIELD

The present invention relates to an RFID tag and an antenna.

BACKGROUND ART

RFID labels, which are attached to objects, are becoming more widespread for logistics management and product management. An RFID label is a label having an RFID tag. The RFID tag includes an IC chip and an antenna electrically connected to the IC chip. The RFID tag is sometimes referred to as a wireless tag or RF-ID tag. The wireless tag can be used for logistics management and can also be used as an information storage medium, by taking advantage of its thinness and lightness in weight. However, because the RFID tag has versatile applications, the RFID tag may be placed in various usage environments. Therefore, it is preferable to configure the RFID tag so as to enable broadband communications because the system will be placed in various usage environments.

Patent Document 1 discloses a technique in which a plurality of communication frequencies can be adapted without changing the affixing position of the wireless tag. The information storage medium disclosed in Patent Document 1 includes a rectangular loop antenna, a wireless IC tag including an integrated circuit element connected to the loop antenna to store identification information, a first spacer having a disposing surface on which the wireless IC tag is disposed, and an auxiliary antenna provided on a surface opposite to the disposing surface on the first spacer. The auxiliary antenna is electromagnetically coupled to the antenna of the wireless IC tag by resonance at the communication frequency of the wireless IC tag, and functions as a resonant antenna by itself. By providing an auxiliary antenna, the communication frequency range can be made broader without changing the affixing position of the wireless IC tag.

BACKGROUND ART

Patent Documents

Patent Document 1

Japanese Laid-Open Patent Application No. 2013-114513

SUMMARY OF INVENTION

Problem to be Solved by the Invention

However, since the related art disclosed in Patent Document 1 requires that an antenna be provided on each of the upper and lower surfaces of the first spacer for broadening the communication, there is room for improvement for broadening the communication without complicating the structure.

The present invention is made in view of the above, and it is an object to obtain an RFID tag that enables broadband communications without complicating the structure.

Means for Solving Problems

In order to solve the above-described problems, there is provided an RFID tag including an IC chip on which identification information is recorded, a loop-like conductor that is connected to the IC chip, and an antenna unit that includes two lattice-shaped antenna patterns connected to the loop-like conductor and extending away from each other from the loop-like conductor.

Effects of the Invention

According to the present invention, it is possible to enable broadband communications without complicating the structure.

MODE FOR CARRYING OUT THE INVENTION

An embodiment of the present invention will be described in detail with reference to the drawings. In the following description, explanation of parts common to the figures may be omitted from explanation, and the same reference numerals may be attached to the parts. Also, the scale of each member in each drawing may differ from the actual scale to facilitate understanding. In each embodiment, deviations from directions such as parallel, orthogonal, horizontal, vertical, up-down, left-right, and the like are tolerated so long as the effects of the present invention are not impaired. X-axis directions, Y-axis directions, and Z-axis directions respectively represent the directions parallel to the X-axis, the directions parallel to the Y-axis, and the directions parallel to the Z-axis. The X-axis directions, Y-axis directions, and Z-axis directions are orthogonal to one another. An XY-plane, YZ-plane, and ZX-plane respectively represent a virtual plane parallel to both the X-axis directions and the Y-axis directions, a virtual plane parallel to both the Y-axis directions and the Z-axis directions, and a virtual plane parallel to both the Z-axis directions and the X-axis directions. In all figures, one direction of the X-axis directions indicated by the arrow is called a positive X-axis direction and the direction opposite to the one direction is called a negative X-axis direction. In the Y-axis directions, one direction indicated by the arrow is called a positive Y-axis direction, and the direction opposite to the one direction is called a negative Y-axis direction. In the Z-axis directions, one direction indicated by the arrow is called a positive Z-axis direction, and the direction opposite the one direction is called a negative Z-axis direction. The X-axis directions correspond to a height direction when a container (described below) is viewed from its side surface. The Y-axis direction corresponds to a horizontal direction when the container (described below) is viewed from its side surface. The Z-axis direction corresponds to a depth direction when the container (described below) is viewed from its side surface.

Figure 1:
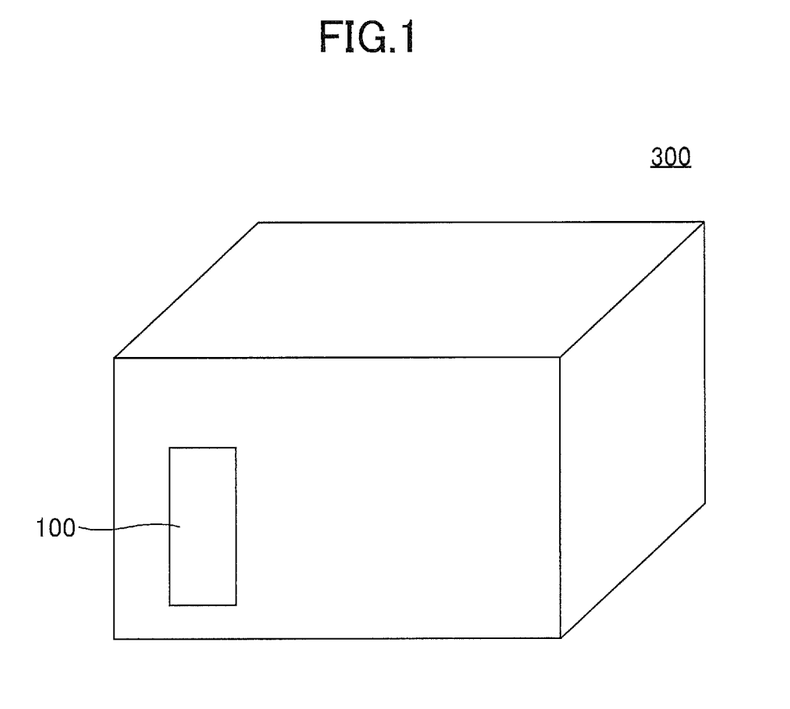
FIG. 1 is a perspective view of a housing in which an RFID tag according to an embodiment of the present invention is provided.

FIG. 1 is a perspective view of a housing 300 in which the RFID tag 100 is provided in accordance with the embodiment of the present invention. The housing 300 illustrated in FIG. 1 is an example of an object to be identified in which the RFID tag 100 is provided, examples of the object being a cardboard box, food packaging, and the like. The object to be identified may be an object in logistics management, inventory management, or the like, and may be, for example, clothing, a PET bottle containing a liquid, or the like. Because the RFID tag 100 is provided with a dipole antenna, the RFID tag 100 is provided in the housing 300 so that the RFID tag 100 is shaped to be vertically long. However, the method of attaching the RFID tag 100 to the housing 300 is not limited thereto.

Figure 2:
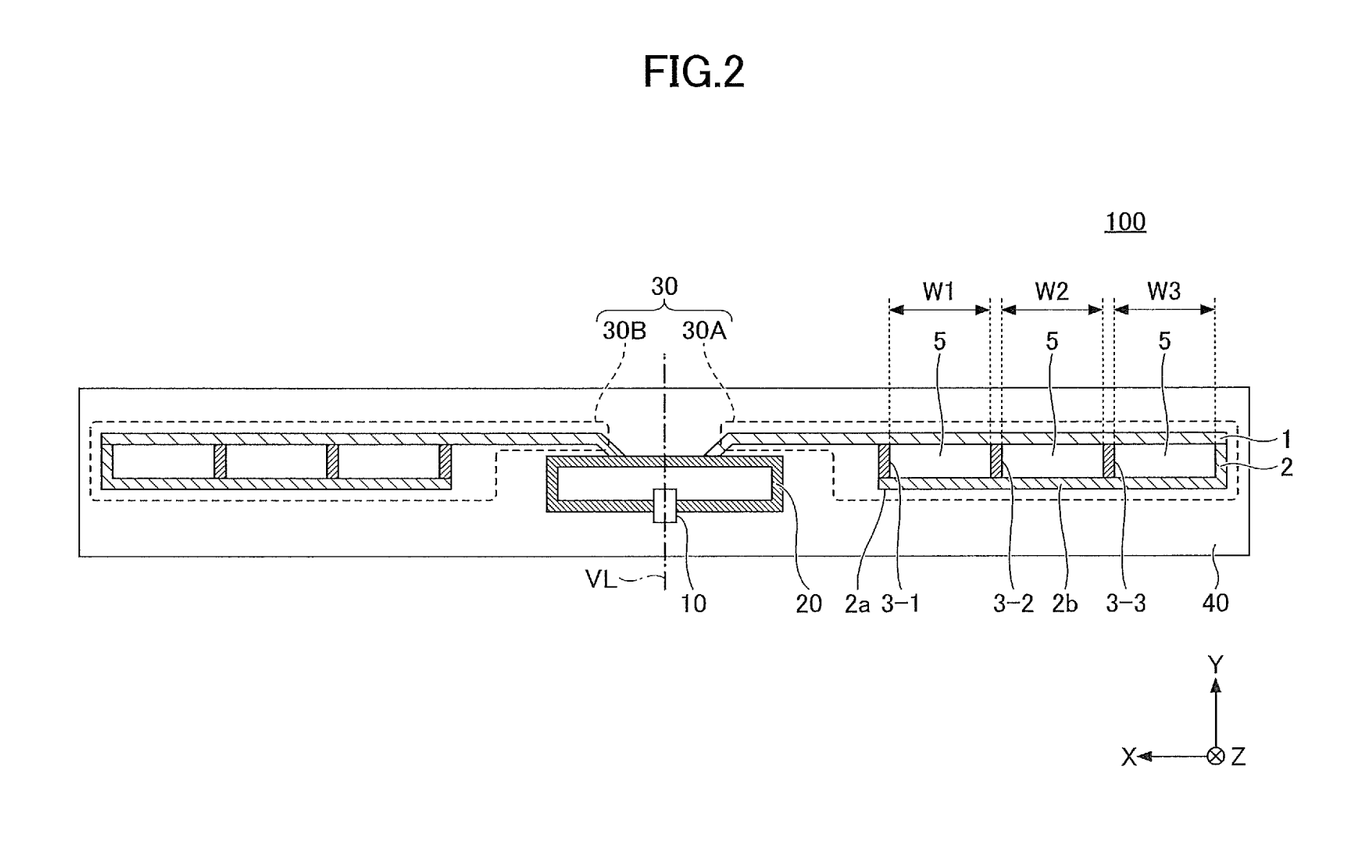
FIG. 2 is a diagram illustrating an example of the structure of the RFID tag.

Next, an example of the structure of the RFID tag 100 will be described with reference to FIG. 2. FIG. 2 is a diagram illustrating an example of the structure of the RFID tag 100. The RFID tag 100 includes a sheet 40 in a strip-like shape, an IC chip 10 on which identification information is recorded, a loop-like conductor 20, and an antenna unit 30.

The sheet 40 is a film formed by laminating a plurality of films made with the synthetic resin, such as polyethylene terephthalate, polypropylene and the like, in a strip. The IC chip 10, loop-like conductor 20, and antenna unit 30 are positioned so as to be sandwiched between a plurality of synthetic resin films to be laminated, for example.

The IC chip 10 has an internal capacitance, and a matching circuit is structured by the inductance of the antenna unit 30 and the internal capacitance of the IC chip 10.

The loop-like conductor 20 is a conductive wiring pattern in which the sheet 40 having a loop-like (annular) shape of one turn or less when the sheet 40 is viewed straight in the Z-axis directions. The conductive wiring pattern can be formed by any conventional method, such as pressing or etching copper foil or aluminum foil, plating, silk screen printing of a metal paste, or metal wire. In this case, the conductive wiring pattern is formed by etching aluminum.

The loop-like conductor 20 is electrically connected to the IC chip 10 and the antenna unit 30. In a case where the identification information recorded in the IC chip 10 is read out by a reader, the antenna unit 30 may receive radio waves of the UHF band, e.g., around 920 MHz (e.g., 860 MHz to 1200 MHz, more preferably 915 MHz to 935 MHz). Then, a current flows through the loop-like conductor 20 due to resonant action. This generates an electromotive force that operates the IC chip 10. When the IC chip 10 operates, the identification information recorded in the IC chip 10 is encoded by the IC chip 10, and the encoded data is wirelessly transmitted to a communication device such as a reader using a radio wave of about 920 MHz as a carrier wave. The reader receiving this signal combines the signals and transfers the combined signal to an external device. In this manner, RFID tag 100 is a passive radio tag that does not have a power source (battery) for holding and transmitting the identification information. Thus, compared to an active wireless tag with a battery, a smaller size and lower cost can be achieved without the battery.

The antenna unit 30 is a dipole antenna configured to have resonant characteristics between the antenna unit 30 and the IC chip 10 with respect to the frequency of radio waves for radio communication (for example, the frequency of the UHF band). The antenna unit 30 as a whole has an electrical length corresponding to substantially $\lambda/2$ ($\lambda$ is the communication wavelength).

The antenna unit 30 has a structure that achieves an impedance conjugate match with the IC chip 10 even when the housing 300 is filled with liquid, for example, for a radio wave of frequency of about 920 MHz. The antenna unit 30 includes two conductors (conductors 30A and 30B) as a structure for realizing an impedance conjugate match with the IC chip 10. Conductors 30A and 30B are conductive wiring patterns connected to the loop-like conductor 20 and extending away from each other from the loop-like conductor 20.

The conductors 30A and 30B are formed in linear symmetry with respect to a virtual line VL passing generally through the center of the IC chip 10. The virtual line VL is a line parallel to the XY plane and extending in the Y-axis direction. The virtual line VL is also a line that substantially bisects the area of the RFID tag 100 in the X-axis direction.

Each of the conductors 30A and 30B has an electrical length corresponding to substantially $\lambda/4$ ($\lambda$ is the communication wavelength). The impedance matching condition of the antenna unit 30 is such that the impedance when viewing a signal source from the side of a load and the impedance when viewing the load from the side of the signal source are complex conjugated to each other. Therefore, when the signal source impedance Zs from the load side is Zs=Rs+jXs, the maximum power is transmitted when the load impedance Zl is Zl=Rs−jXs.

Because the conductors 30A and 30B are linearly symmetrical with respect to the virtual line VL, mainly the structure of the conductor 30A will be described below. The direction of the extension of the conductor 30B is opposite to the direction of the extension of the conductor 30A in the X-axis direction. Such description of the conductor 30B is omitted.

The conductor 30A includes a first element 1, a second element 2, and a third element 3. The first element 1, the second element 2, and the third element 3 form a lattice-shaped antenna pattern connected to the loop-like conductor 20 as a whole. The conductor 30B is also configured in the same manner as the conductor 30A. Thus, the antenna unit 30 has two lattice-shaped antenna patterns connected to the loop-like conductor 20 and extending away from each other from the loop-like conductor 20.

The first element 1 is, for example, a conductive wiring pattern in a linear shape. The first element 1 extends from the loop-like conductor 20 in the negative x-axis direction. The first element 1 is a linear element. An end portion of the first element 1 in the positive X-axis direction is connected to the loop-like conductor 20. The connection between the first element 1 and the loop-like conductor 20 is, for example, a peripheral portion of the loop-like conductor 20 in the plus-Y-axis direction. The first element 1 extends from the connecting portion between the first element and the loop-like conductor 20 at a predetermined angle (e.g., 30 degrees to 60 degrees) with respect to the negative X-axis direction for a predetermined distance, and further extends in the negative X-axis direction from an extended portion at the predetermined distance from the connecting portion.

Because the first element 1 is connected to a peripheral portion of the loop-like conductor 20 in the positive Y-axis direction, the width in the X-axis directions of the antenna unit 30 can be narrowed. Therefore, the RFID tag 100 has a small ratio between a vertical width and a horizontal width. Therefore, for example, the RFID tag 100 may be disposed even when the RFID tag 100 is attached to a small-capacity PET bottle having a relatively low height in the X-axis direction or a label that has a low height in the X-axis directions and attached to the PET bottle.

The connecting portion between the first element 1 and the loop-like conductor 20 is not limited thereto, and may be a peripheral portion of the loop-like conductor 20 in the negative X-axis direction. With this structure, the first element 1 can be disposed in the region of the loop-like conductor 20 in the negative X-axis direction. Therefore, the width in the Y-axis direction of the antenna unit 30 is narrowed so that the RFID tag 100 in an elongated shape can be realized. Therefore, even when the RFID tag 100 is attached to a PET bottle having a relatively high height in the X-axis direction, for example, the RFID tag 100 can be disposed in an area where a product indication of the PET bottle is not visually obstructed.

The second element 2 is a conductive wiring pattern having a hook shape that extends from the tip of the first element 1 that is in the negative X-axis direction in a direction different from the direction to which the first element 1. The second element 2 is called a hook element. The second element 2 may have a U-shaped pattern or an L-shaped pattern.

The first element 1 and the second element 2 may be integrally formed in a hook shape.

As illustrated in FIG. 2, the second element 2 extends for a certain distance in the negative Y-axis direction from the tip of the first element 1 in the negative X-axis direction, bends vertically in the positive X-axis direction, and extends for a certain distance toward the loop-like conductor 20. With this shape, the region of the loop-like conductor 20 in the negative X-axis direction can be effectively utilized. Therefore, the RFID tag 100 having a small ratio between the vertical and horizontal widths can be realized.

A gap is formed between the portion of the second element 2 extending toward the loop-like conductor 20 and the first element. The gap (the separation distance in the Y-axis directions) is preferably set to a value, for example, from 1.0 mm to 30.0 mm, in order to optimize the communication distance at 920 MHz. A plurality of third elements 3-1, 3-2, and 3-3 are provided in the gap. Hereinafter, when the third element 3-1, the third element 3-2, and the third element 3-3 are not distinguished, they may be referred to as a "third element 3".

The third element 3 is a conductive wiring pattern extending from the first element 1 to the second element 2 and forming a lattice-shaped pattern with the first element 1 and the second element 2. The third element 3 is a lattice element.

The end portion of the third element 3-1 in the negative Y-axis direction is connected to the end portion 2a in the positive X-axis direction of the second element 2, for example.

The end portion of the third element 3-2 in the negative Y-axis direction is connected in between the end portion 2a of the second element 2 in the positive X-axis direction and the intermediate point 2b of the second element 2, for example. The intermediate point 2b of the second element 2 is a part that divides the element extending in the X-axis directions into two equally divided parts in the X-axis directions out of the whole of the second element 2.

The end portion of the third element 3-3 in the negative Y-axis direction is connected between the intermediate point 2b of the second element 2 and the end portion of the second element 2 in the negative X-axis direction.

The distances between two adjacent third elements 3 are substantially equal. That is, the width W1 in the X-axis directions from the third element 3-1 to the third element 3-2 is substantially equal to the width W2 in the X-axis directions from the third element 3-2 to the third element 3-3. The expression of "substantially equal" means, for example, that the width W2 is set in a range of W1×1.2 to W1×0.8.

The width of the element from among the whole of the second element 2 extending in the Y-axis directions to the third element 3-3 is designated by W3. The width W3 is substantially equal to the width W1 or the width W2. The expression of "substantially equal" means, for example, that width W3 be set in a range of W1×1.2 to W1×0.8 or in a range of W2×1.2 to W2×0.8.

Each of the width W1, width W2 and width W3 is preferably set to a value of, for example, 1.0 mm to 30.0 mm in order to optimize the communication distance in a desired frequency range. If the widths W1, width W2, and width W3 are too large, the length of the dipole may be out of the optimal length for the communication in the desired frequency range and it is difficult to obtain a resonance.

By providing a plurality of third elements 3, three closed-loop portions 5 are formed.

The closed-loop portion 5 formed at a position near the loop-like conductor 20 is formed by the first element 1, the second element 2, the third element 3-1, and the third element 3-2.

The closed-loop portion 5 formed near the intermediate point 2b of the second element 2 is formed by the first element 1, the second element 2, the third element 3-2, and the third element 3-3.

The closed-loop portion 5 formed at a position near the connection portion between the first element 1 and the second element 2 is formed by the first element 1, the second element 2, and the third element 3-3.

Each closed-loop portion 5 is a loop element shaped to be substantially square. When two or more closed-loop portions 5 (three closed-loop portions 5 in FIG. 2) are formed, the impedance of the conductor 30A is lowered to thereby increase the antenna gain.

In addition, as the number of the closed-loop portions 5 increases, the extent to which the impedance of the conductor can be lowered increases. Therefore, the antenna may have a higher antenna gain, a smaller variation, and flatness over a broader frequency range.

In this embodiment, the three third elements 3 are used as an example, but the number of the third elements 3 may be two or more. For example, by omitting any one of the three third elements 3, two closed-loop portions 5 may be formed. Even in this structure, since the impedance of the conductor 30A is reduced compared to the case where the third element 3 is one, a high antenna gain is obtainable over a broad frequency range.

The electric length of each element is set as follows.

For example, the electrical length of the first element 1 is set to a multiple of the wavelength λ/4 of the frequency to be used. In this case, the electrical length of the second element 2 is set to a length different from the electrical length of the wavelength used that is a multiple of λ/4. In this case, the different electrical length is in a range from, for example, λ/3.5 to λ/4.5 of the wavelengths of the frequency to be used.

In addition, instead of the first element 1, the sum of the electrical length of the first element 1 and the electrical length of the second element 2 having a shape like L (inverse L) may be set to a multiple of λ/4 of the wavelength of the frequency to be used. In this case, the electrical length of the third element 3 (e.g., any one of the three third elements 3) is set to be different from the electrical length of the wavelength to be used that is a multiple of λ/4. In this case, the different electrical length is in a range from, for example, λ/3.5 to λ/15.5 of the wavelength of the frequency to be used. The different electrical lengths in this case may be, for example, a value obtained by adding up two or three from among the three third elements 3.

Instead of the first element 1, the sum of the electrical length of the first element 1, the electrical length of the second element 2, and the electrical length of the third element 3 (e.g., any one of the three third elements 3) may be set to a multiple of λ/4 of the wavelength of the operating frequency. In this case, for example, the electrical lengths of each of the three third elements 3 and the remaining two elements are set to be different from the electrical length which is a multiple of λ/4 of the wavelength to be used. In this case, the different electrical length is in a range from, for example, λ/3.5 to λ/15.5 of the wavelength of the frequency to be used.

The frequency characteristics of the RFID tag 100 will now be described with reference to FIG. 3.

Figure 3:
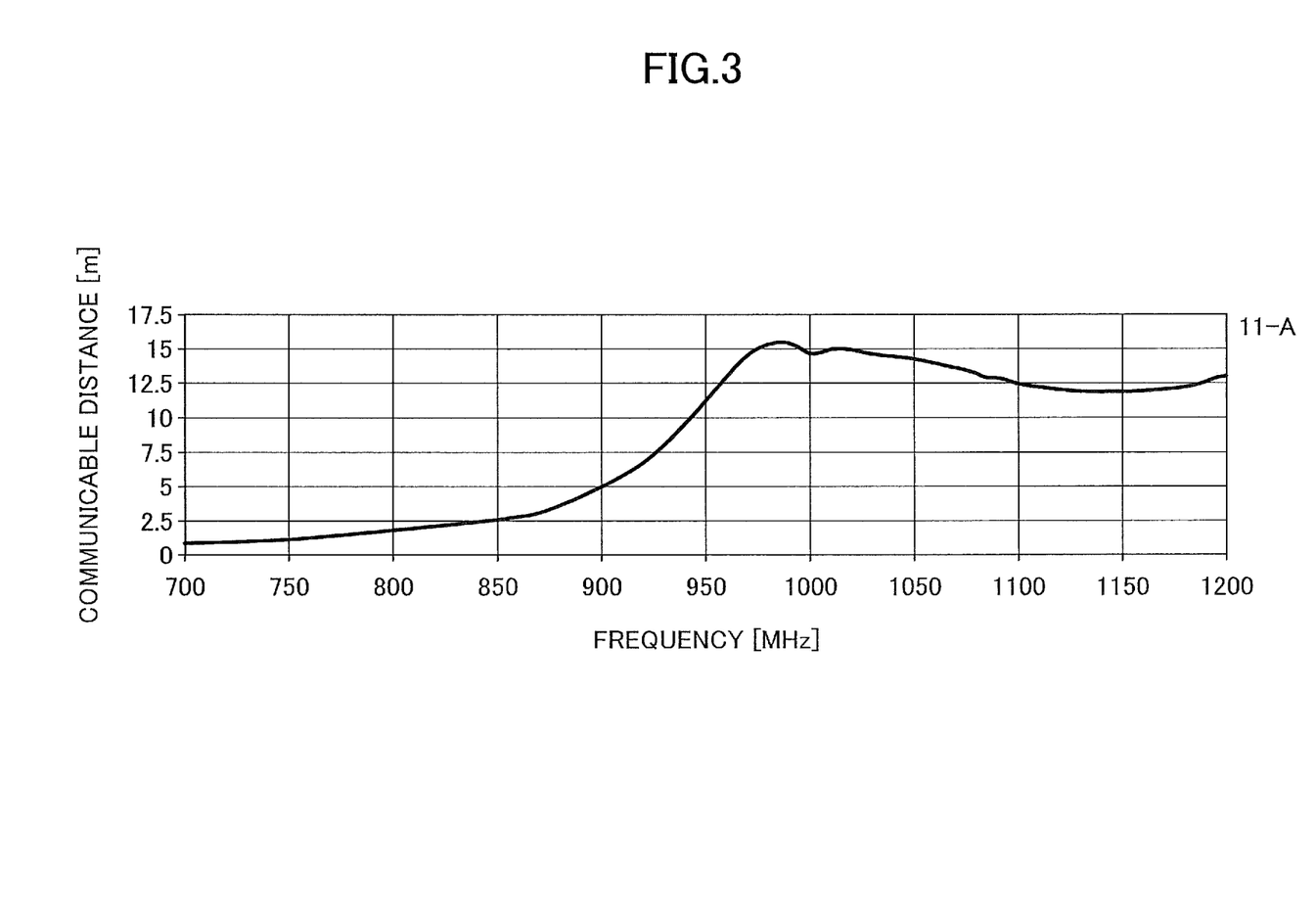
FIG. 3 is a diagram illustrating the frequency characteristics of the RFID tag.

FIG. 3 illustrates the frequency characteristics of the RFID tag 100. The horizontal axis indicates the frequency of the radio wave for radio communication. The vertical axis indicates the communication distance from the RFID tag 100 to the reader. From FIG. 3, it can be known that the RFID tag 100 may set the band of effective resonant frequency (e.g., 860 MHz to 1150 MHz, preferably 920 MHz to 1150 MHz) to be wide.

Figure 4:
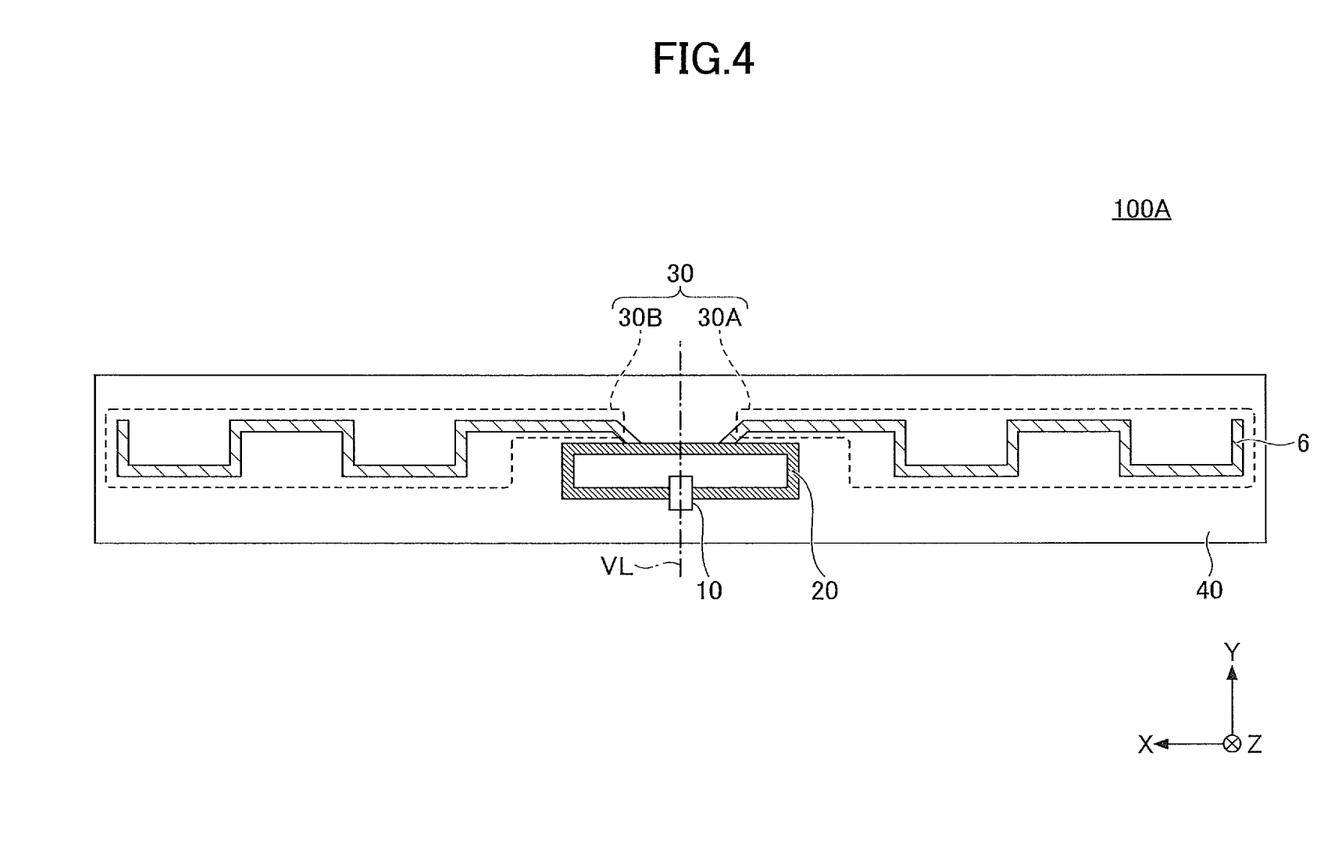
FIG. 4 is a diagram illustrating an example of the structure of a comparative example of the RFID tag.

A comparative example of the present embodiment will be described with reference to FIG. 4. FIG. 4 is a diagram illustrating the structure of a comparative example of the RFID tag 100. The RFID tag 100A according to the comparative example is provided with an element 6 that is a wiring pattern in a meandering shape instead of the first element 1, the second element 2, and the third element 3. The element 6 is a conductive wiring pattern in a rectangular shape, which is connected to the loop-like conductor 20 and extends in the X-axis directions from the loop-like conductor 20. The element 6 is set to have the electrical length that is a multiple of ¼ of the wavelength of the frequency to be used.

Figure 5:
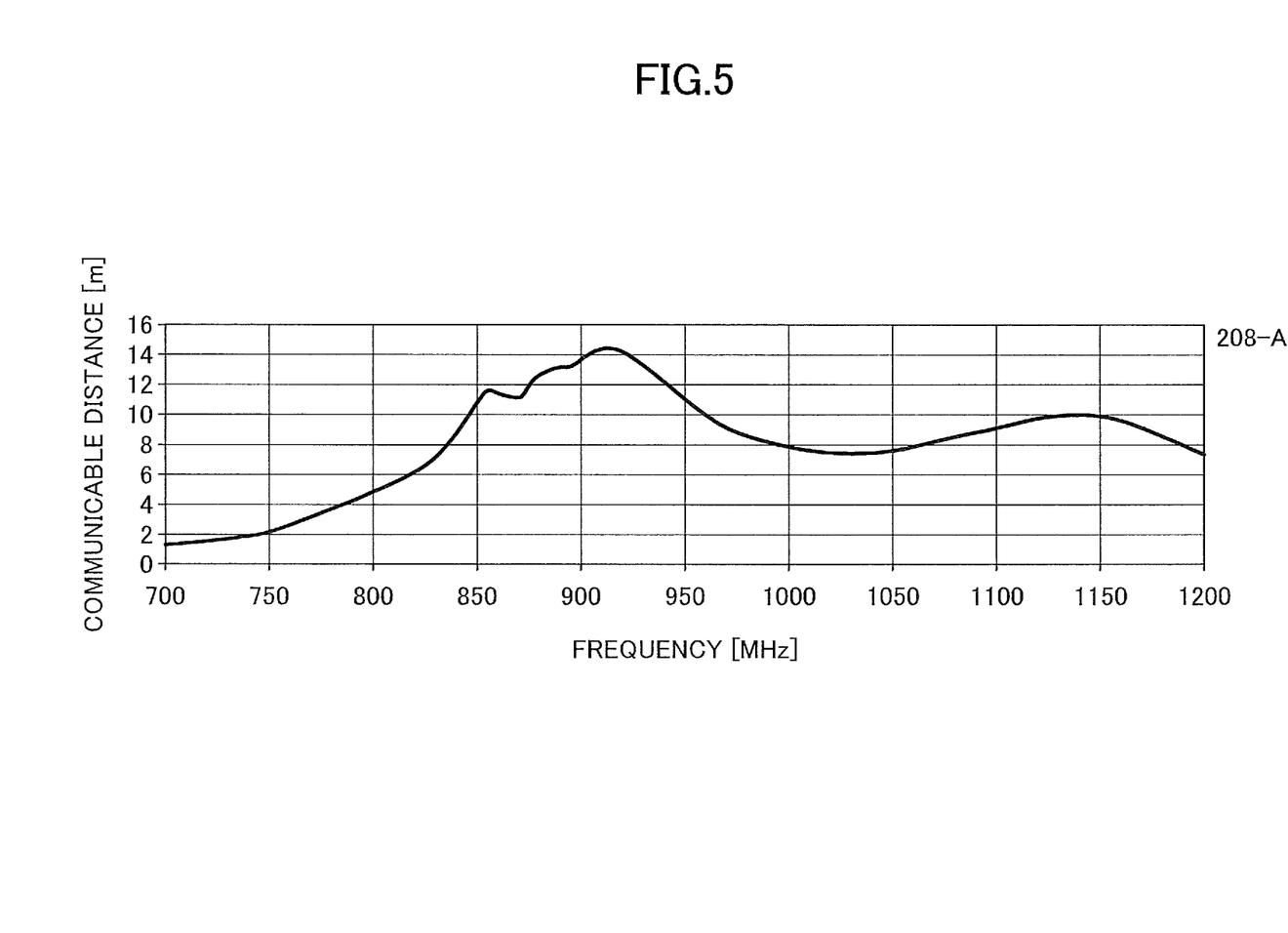
FIG. 5 is diagram illustrating the frequency characteristics of the RFID tag.

The frequency characteristics of the RFID tag 100A structured in this manner will be described with reference to FIG. 5. FIG. 5 is a diagram illustrating the impedance characteristics of RFID tag 100A. The horizontal axis indicates the frequency of the radio wave for radio communication. The vertical axis indicates the communication distance from the RFID tag 100A to the reader.

Because the RFID tag 100A uses a single antenna element having a meandering shape to earn the electrical length, the communicable frequency range is narrow compared to the characteristics illustrated in FIG. 3.

On the other hand, according to the RFID tag 100 according to the present embodiment, by combining the first element 1 in the linear shape, the second element 2 in the L shape, and the at least two of the third elements 3, the antenna pattern in a ladder shape (lattice shape) can be formed as a whole. This ladder-like antenna pattern is equal to a combination of antenna elements having different electrical lengths, which are formed on a single plane. Therefore, compared to the case where an antenna element having a single electrical length is used, the resonance conditions of the antenna unit 30 and the IC chip 10 can be expanded, and the communication frequency becomes broadband. That is, the condition of the impedance conjugate match can be satisfied in a broad frequency range, and the reception intensity of radio wave at the antenna unit 30 can be increased.

In addition, the RFID tag 100 according to the present embodiment provides broadband for the effective resonant frequency (e.g., 900 MHz to 1150 MHz). Therefore, variations in the antenna elements during manufacturing of the antenna unit 30 can be allowed to some extent. Accordingly, it is possible to obtain effects of relaxing conditions for variations at a time of designing and manufacturing the product design and lowering product costs.

Further, according to the RFID tag 100 in the present embodiment, a plurality of antenna elements having different shapes and electrical lengths are arranged on the same plane, so that it is not necessary to provide the antenna elements on the up-down surfaces of the spacers by using the spacers as in the background art described above. As a result, the structure of RFID tag 100 is simplified to avoid the use of spacers for providing the antenna elements, and the control of manufacturing tolerances for the plurality of antenna elements is facilitated. As a result, the yield percentage of the RFID tag 100 can be improved and the manufacturing cost can be reduced further.

The RFID tag 100 according to the present embodiment may also be structured as follows. The explanation of the same part of the RFID tag 100 having the same reference numerals is omitted and different parts are described.

Figure 6:
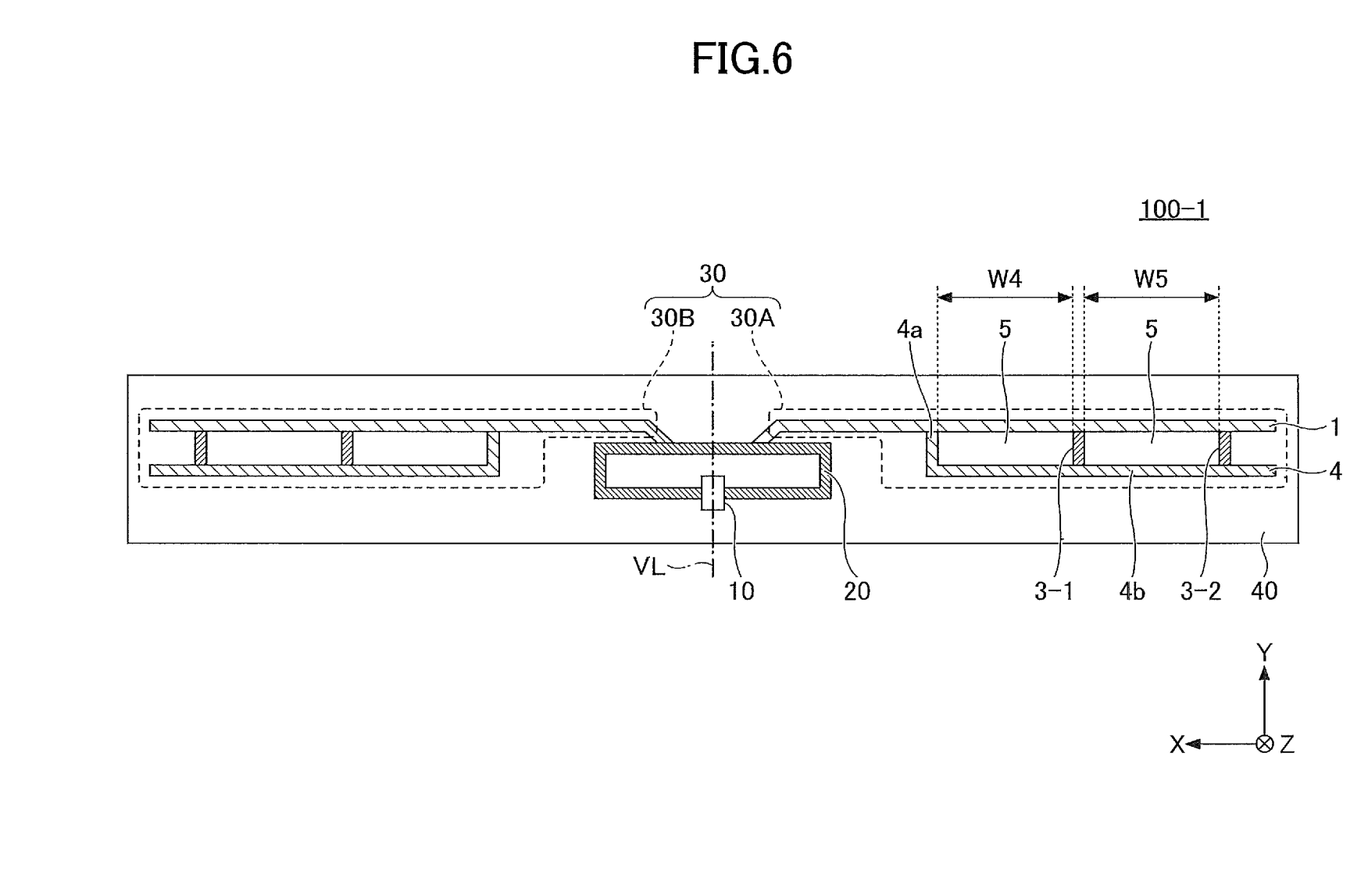
FIG. 6 is a diagram illustrating an example of the structure of an RFID tag according to a modified example.

FIG. 6 is a diagram illustrating an example of the structure of a RFID tag 100-1 according to a modified example. Compared to the RFID tag 100, RFID tag 100-1 uses a fourth element 4 instead of the second and third elements 2 and 3.

The fourth element 4 is connected to the first element 1 so as to branch from a portion partway along the first element 1, which is a linear element, and is a conductor extending in parallel with the first element 1. The fourth element 4 is a branching element.

A connection portion 4a of the fourth element 4 to the first element 1 is provided, for example, at a position a predetermined distance from a connection point of the first element 1 and the loop-like conductor 20. A predetermined distance is preferably set to a value, e.g., from 5.0 mm to 100.0 mm so as to increase the communication distance.

A gap is formed between the first element 1 and a portion of the fourth element 4 extending in a direction opposite to the loop-like conductor 20. It is preferable that this gap (the separation distance in the Y-axis directions) be set to a value, for example, from 1.0 mm to 30.0 mm, so that the optimum communication distance can be obtained in a target frequency range. If this distance is too long, it will deviate from the optimal dipole length in the target frequency range. Therefore, it becomes difficult to obtain a resonance. For example, a third element 3-1 and a third element 3-2 are provided in this gap. The third element 3-1 and the third element 3-2 are provided so as to be apart in the X-axis directions from each other.

The third element 3-1 and the third element 3-2 are conductive wiring patterns extending from the first element 1 to the fourth element 4 and forming a lattice-shaped pattern in combination with the first element 1 and the fourth element 4. The third element 3-1 and the third element 3-2 are lattice elements.

The end portion of the third element 3-1 in the negative Y-axis direction is connected, for example, between the connection portion 4a of the fourth element 4 and the intermediate point 4b of the fourth element 4. The intermediate point 4b of the fourth element 4 is a part that divides the element extending in the X-axis direction into two equal parts in the X-axis direction out of the whole of the fourth element 4.

The end of the third element 3-2 in the negative Y-axis direction is connected between the intermediate point 4b of the fourth element 4 and the end of the fourth element 4 in the negative X-axis direction.

The width of the fourth element 4 from the element extending in the Y-axis directions to the third element 3-1 is indicated as W4. Further, the width of the fourth element 4 from the third element 3-1 to the third element 3-2 in the X-axis directions is W5. The width W4 is substantially equal to the width W5. The expression of "substantially equal" means, for example, that the width W4 is set in a range W5×1.2 to W5×0.8.

Each of the widths W4 and W5 is set to a value, e.g., from 1.0 mm to 30.0 mm.

The two closed-loop portions 5 are formed by providing a plurality of third elements 3.

The closed-loop portion 5 formed at a position close to the loop-like conductor 20 is formed by the first element 1, the fourth element 4, and the third element 3-1.

The closed-loop portion 5 is formed near the intermediate point 4b of the fourth element 4 and includes the first element 1, the fourth element 4, the third element 3-1, and the third element 3-2.

Each closed-loop portion 5 is a generally square loop element. As described above, the impedance of the conductor 30A is lowered by providing the two or more closed-loop portions 5 are formed. Therefore, the antenna gain can be increased.

The electrical length of each element is set as follows.

For example, the length of the first element 1 is set to the electrical length that is a multiple of $\lambda/3$ to $\lambda/5$ where $\lambda$ designates the wavelength of the frequency to be used. In this case, the length of the fourth element 4 is set to the electrical length that is a multiple of $\lambda/3.5$ to $\lambda/8$. Different electrical lengths range from, for example, $\lambda/3.5$ to $\lambda/4.5$ where $\lambda$ designates the wavelength of the frequency to be used.

Alternatively, instead of the first element 1, the electrical length of the fourth element 4 may be set to a multiple of $\lambda/4$ where $\lambda$ designates the wavelength of the frequency to be used. In this case, the electrical length of the first element 1 is set to the electrical length different from the electrical length that is the multiple of $\lambda/4$ where $\lambda$ designates the wavelength of the frequency to be used. In this case, the different electrical lengths range from, for example, $\lambda/3.5$ to $\lambda/4.5$ where $\lambda$ designates the wavelength of the frequency to be used.

Alternatively, instead of the first element 1, the sum of the electrical length of the fourth element 4 and the electrical length of the third element 3 (e.g., any one of the two third elements 3) may be set to the multiple of $\lambda/3$ to $\lambda/5$ where $\lambda$ designates the wavelength of the frequency to be used. In this case, the electrical length of the first element 1 is set to be different from the electrical length of the multiple of $\lambda/3$ to $\lambda/5$ where $\lambda$ designates the wavelength of the frequency to be used. In this case, the different electrical lengths are, for example, in a range from $\lambda/3.5$ to $\lambda/8$ where $\lambda$ designates the wavelength of the frequency to be used.

According to RFID tag 100-1, a combination of multiple elements having different electrical lengths and different shapes enable an effect similar to the RFID tag 100 to be obtained.

Further, according to the RFID tag 100-1, since the structure is easy to adjust the branch position of the fourth element 4, that is, the position of drawing the fourth element 4 from the first element 1, the design conditions of the RFID tag 100-1 can have a degree of freedom. For example, in a case where the housing 300 is required to have the surface area of the RFID tag 100-1 which is as small as possible, it is assumed that the area below the first element 1 (on the side of the negative Y-direction direction) is narrowed. Even in this case, the branch portion of the fourth element 4 is made as close as possible to the loop-like conductor 20, and the length of the portion extending in the X-axis directions of the fourth element 4 is shortened, so that it can be applied to the housing 300. Accordingly, the manufacturing unit price of the RFID tag 100-1 can be further reduced so that the production amount of the RFID tag 100-1 can be increased as the housing 300, to which the RFID tag 100-1 is applicable, increases.

Each of the RFID tags 100 to 100-1 according to the present embodiment is applicable not only to the radio waves of the UHF band but also to radio waves of the VHF band, the SHF band, and the like. When the frequency used for the RFID tags 100 to 100-1 is the frequency of the UHF band, the UHF band has a higher frequency than the VHF band, thereby shortening the wavelength and advantageously reducing the antenna size. Therefore, by making the RFID tags 100 to 100-1 according to the present embodiment suitable for the radio waves in the UHF band, it is possible to downsize the IC chip 10, and at the same time, it is possible to obtain a wireless tag having a small memory capacity and low cost.

In addition, each of the RFID tags 100 to 100-1 according to the present embodiment is applicable to both a wireless tag of an electromagnetic induction type radio tag and a wireless tag of a radio wave type. In particular, when each of the RFID tags 100 to 100-1 is applied to a wireless tag of a radio wave type radio tag, a predetermined radio communication distance from a reader can be secured. The predetermined radio communication distance is in a range from 0 m to 20 m, for example.

The structure illustrated in the above-described embodiments is an example of the content of the present invention, and it can be combined with another known art, or part of the structure can be omitted or changed without departing from the summary of the present invention.

This international application claims priority under Japanese Patent Application No. 2019-134034, filed Jul. 19, 2019, the entire contents of which are hereby incorporated by reference herein.

DESCRIPTION OF SYMBOLS

1: First element
2: Second element
3: Third element
4: Fourth element
10: IC chip
20: Loop-like conductor
30: Antenna unit
30A: Conductor
30B: Conductor
40: Sheet
100: RFID tag
100-1: RFID tag
300: Container
IC: Wireless?
VL: Virtual line

The invention claimed is:
1. An RFID tag comprising:
an IC chip on which identification information is recorded;
a loop-like conductor that is connected to the IC chip; and
an antenna unit that includes a first lattice-shaped antenna pattern and a second lattice-shaped antenna pattern, the first lattice-shaped antenna pattern and the second lattice-shaped antenna pattern connected to the loop-like conductor and extending away from each other from the loop-like conductor, the first lattice-shaped antenna pattern formed by a first antenna conductor having a first closed loop, and the second lattice-shaped antenna pattern formed by a second antenna conductor having a second closed loop, wherein each of the first antenna conductor and the second antenna conductor includes a linear element which has a connection connected to the loop-like conductor, an angled portion extending from the connection at a predetermined angle with respect to a longitudinal direction of the RFID tag, and an extending portion extending in the longitudinal direction to be away from the loop-like conductor, the linear elements mutually extending so as to be separated.

2. The RFID tag according to claim 1, wherein each of the first antenna conductor and the second antenna conductor includes a linear element connected to the loop-like conductor and extending in a direction away from the loop-like conductor, the linear elements mutually extending so as to be separated, a hook element that is a shaped like a hook, the hook element being disposed at a tip end of the linear element and extending in a direction different from the direction in which the linear element extends, and at least two lattice elements extending from the linear element to the hook element and forming a lattice-shaped pattern together with the linear element and the hook element.

3. The RFID tag according to claim 2, wherein each of the first closed loop of the first antenna conductor and the second closed loop of the second antenna conductor is formed by the linear element, the hook element, and the at least two of the lattice elements.

4. The RFID tag according to claim 1, wherein each of the first antenna conductor and the second antenna conductor includes a linear element connected to the loop-like conductor and extending in a direction separating from the loop-like conductor, the linear elements mutually extending so as to be separated, a branching element connected to the linear element so as to be branching from a portion partway along the linear element, the branching element extending in parallel with the linear element, and at least two lattice elements extending from the linear element to the branching element and forming a lattice-shaped pattern together with the linear element and the branching element.

5. The RFID tag according to claim 4, wherein each of the first closed loop of the first antenna conductor and the second closed loop of the second antenna conductor is formed by the linear element, the branching element, and the at least two of the lattice elements.

6. The RFID tag according to claim 1, wherein the frequency to be used is a frequency of an UHF band.

7. The RFID tag according to claim 1, wherein the RFID tag is a wireless tag of a radio wave type.

8. An antenna to be applied to the RFID tag according to claim 1.

9. The RFID tag according to claim 1, wherein the first antenna conductor has a first end which is opposite to a loop end where the first closed loop is located, wherein the second antenna conductor has a second end which is opposite to a loop end where the second closed loop is located, and wherein the first lattice-shaped antenna pattern and the second lattice-shaped antenna pattern are connected to the loop-like conductor via the first end of the first antenna conductor and the second end of the second antenna conductor, respectively.

* * * * *